Dec. 30, 1947.   C. E. TACK ET AL   2,433,582
ROTOR BRAKE
Filed Nov. 29, 1943   2 Sheets-Sheet 1
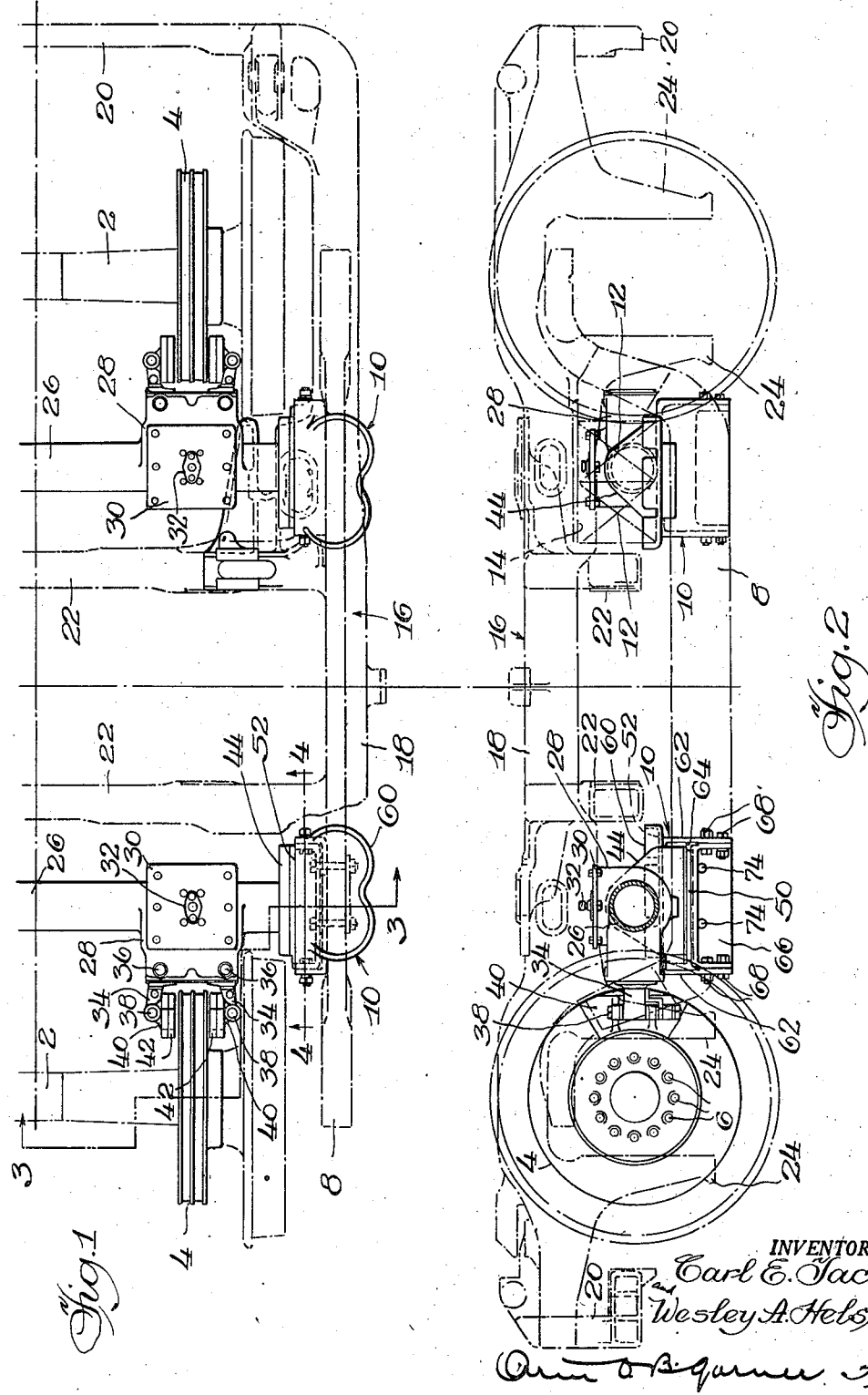
INVENTORS.
Carl E. Tack
Wesley A. Helsten

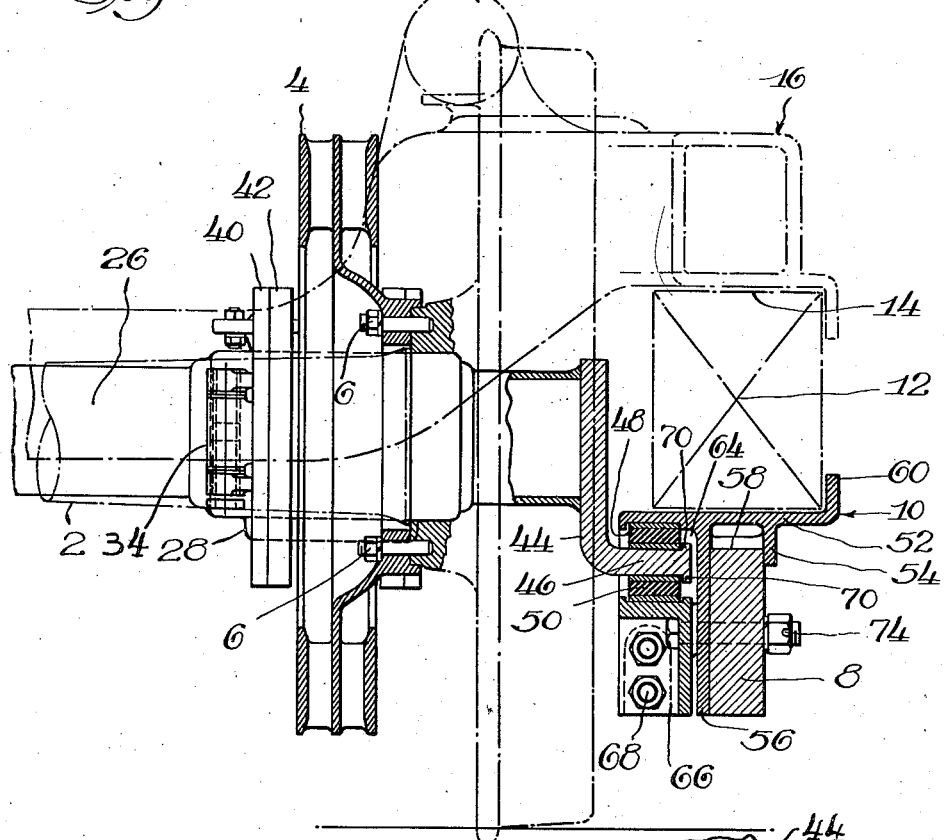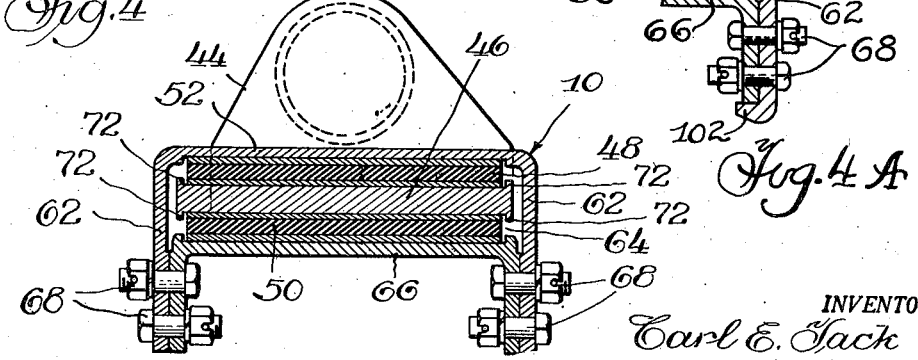

Patented Dec. 30, 1947

2,433,582

UNITED STATES PATENT OFFICE 2,433,582

ROTOR BRAKE

Carl E. Tack and Wesley A. Helsten, Chicago, Ill., assignors to American Steel Foundries, Chicago, Ill., a corporation of New Jersey Application November 29, 1943, Serial No. 512,110

8 Claims. (Cl. 188—59)

Our invention relates to railway brake mechanism and is illustrated in an embodiment utilizing a four wheel passenger car truck. Our invention is more particularly concerned with the application to railway car trucks of a practical disc brake arrangement wherein clasp brake means is supported from the truck frame for engagement with rotor discs carried on the supporting wheel and axle assemblies.

The general object of our invention is to devise a rotor braking arrangement for a railway car truck which will be generally applicable to existing types of trucks and will suitably meet the existing manufacturing standard requirements, such as clearance conditions, standards of strength and the like.

A more specific object of our invention is to devise such a brake utilizing an independent brake frame associated with each wheel and axle assembly and conveniently supported from the equalizer normally utilized in the common type of passenger car truck. Our present invention is an improvement on the generic type illustrated in our copending application Serial No. 501,363, Patent No. 2,399,071, April 23, 1946.

Another object of our invention is to design a brake arrangement such as above described in which each brake frame is in the form of a beam extending transversely of the truck and afforded a two-point support therefrom, the usual torque arm or arms being eliminated. The brake beam is of novel form and comprises at each end thereof a flat web presenting generous top and bottom bearing surfaces of generally rectangular form, said web being clamped between resilient pads bearing against said surfaces and mounted in the illustrated embodiment of our invention on the adjacent equalizer-supported spring seat.

A further object of our invention is to design a novel spring seat element adapted to be mounted on the truck equalizer and affording support for the truck frame supporting springs, said spring seat element comprising resilient clamping means for the adjacent end of the associated brake frame or beam.

In the drawings,

Figure 1 is a fragmentary top plan view of a railway passenger car truck embodying our invention, only one side of the truck being illustrated inasmuch as it is symmetrical about its longitudinal center line, a portion of the truck frame being broken away in the left half of this figure to more clearly illustrate the structure therebeneath.

Figure 2 is a side view of the structure shown in Figure 1, the right half of Figure 2 being a side elevation and the left half thereof being a sectional view taken in the longitudinal vertical plane bisecting the truck.

Figures 3 and 4 are sectional views taken respectively in the planes indicated by the lines 3—3 and 4—4 of Figure 1.

Figure 4A is a fragmentary sectional view comparable to Figure 4 but illustrating a modification of our novel spring seat structure.

Describing our invention in detail, the truck comprises the spaced wheel and axle assemblies 2, 2 comprising the brake discs 4, 4 secured thereto as at 6, 6, the journal ends of said assemblies being received in conventional manner within journal boxes (not shown). Mounted on the journal boxes at each side of the truck is an equalizer 8 of conventional form, and supported from each equalizer 8 adjacent each end thereof is a composite spring seat member or casting, generally designated 10 and affording support for the springs 12, 12 diagrammatically illustrated in Figure 3 and in the right half of Figure 2, said springs being seated as at 14 against the truck frame 16 and affording resilient support therefor in the usual manner.

The truck frame 16 is of conventional form comprising the side rail 18 at each side thereof merging with an end rail 20 at each end of the truck and a pair of spaced transoms 22, 22 formed and arranged in usual manner for the support of a truck bolster (not shown) interposed therebetween. At each end thereof the side rail 18 is provided with the depending pedestal legs 24, 24 adapted for the reception of the associated journal box.

A brake frame or beam 26 is supported adjacent each wheel and axle assembly 2, as hereinafter more fully described, said beam comprising adjacent each end thereof a cylinder housing 28 having a cover plate 30 provided with a nozzle 32 affording convenient connection to a fluid supply line (not shown), said supply line conveying actuating fluid to a cylinder within the housing 28 and operatively associated in usual manner with the brake levers 34, 34 fulcrumed as at 36, 36 within the housing 28. The levers 34, 34 are pivoted as at 38, 38 to brake heads 40, 40 carrying brake shoes 42, 42 for engagement with opposite sides of the adjacent brake disc or rotor 4. Each end of the beam 26 is provided with a plate-like member 44 of L-section, as seen in Figure 3, said member being secured to the beam 26 in any convenient manner, such as by welding, and having its horizontal leg 46 compressed between top and bottom resilient members 48 and 50 mounted on the adjacent spring seat member 10, as hereinafter described.

The spring seat member, as best seen in the sectional views of Figures 3 and 4, comprises the top web 52 and the spaced integral depending webs 54 and 56, said depending webs embracing the adjacent portion of the equalizer 8 upon which the spring seat member is seated as at 58. The top web 52 is provided with an upstanding flange 60 affording convenient confining means for the springs 12, 12 which are seated on the web 52 and afford support for the truck frame 16, as above described. Integrally formed with the top web 52 and the inboard depending web 56 are the spaced end walls 62, 62 defining a pocket 64 for the reception of the resilient members 48 and 50.

As will be clearly understood from a consideration of Figures 3 and 4, each resilient member 48 and 50 is a composite member comprising a resilient pad with top and bottom liners secured thereto as by vulcanizing. The members 48 and 50 are compressed against the leg 46 of the member 44 by means of a clamping piece 66, which is secured to the end walls 62, 62 by means of bolt and nut assemblies 68, 68, the leg 46 of the member 44 being provided with top and bottom end flanges 70, 70 and top and bottom lateral flanges 72, 72 cooperating with the resilient members 48 and 50 whereby relative movement between the beam 26 and the equalizer 8 laterally or longitudinally of the truck is resisted in shear by the members 48 and 50. The spring seat member 10 is maintained in its proper position longitudinally of the equalizer 8 by means of the bolt and nut assemblies 74, 74 extending through said equalizer and the inboard depending web 56 of the spring seat member as well as the clamping piece 66, as will be clearly seen in Figures 2 and 3.

The leg 46 of the member 44 at each end of the beam 26 is provided with generous substantially rectangular bearing surfaces for cooperation with the resilient members 48 and 50, said bearing surfaces being of considerably greater width than that of the beam 26. By means of this arrangement we are enabled to eliminate the usual torque arm or arms customarily associated with the brake beam for transmitting torque to the truck structure.

Thus it will be seen that we have designed a novel brake arrangement in which the brake frame or beam is afforded a two-point resilient support from the truck structure, said two-point support being the sole torque transmitting means and support means for the beam with respect to the truck. As will be understood from a consideration of Figure 3, the beam 26 and its associated braking mechanism may be removed from the truck by removing the clamping pieces 66, 66 and dropping the beam 26 from its engagement with the truck, while the equalizer, the truck frame, and the supporting wheel and axle assemblies remain in normal assembled relationship. Likewise, it will be understood that, if desired, the wheel and axle assemblies and the equalizers 8, 8 together with the brake beams 26, 26 may be dropped from the truck frame 16 during a servicing operation without the necessity of disconnecting the brake beams 26, 26 from the truck frame 16, as in arrangements heretofore utilized wherein the beams have been connected to the truck frames by means of torque arms.

Referring now to Figure 4A, which illustrates a slight modification of our novel spring seat structure, it will be seen that each end wall 62 of the spring seat member 10 is provided with the inturned flange 102 underlying the adjacent portion of the clamping piece 66 and affording support therefor in the event of failure of the bolt and nut assemblies 68, 68.

It is to be understood that we do not wish to be limited by the exact modifications of the device shown which are merely by way of illustration and not limitation as various and other forms of the device will, of course, be apparent to those skilled in the art without departing from the spirit of the invention or the scope of the claims.

We claim:

1. In a brake arrangement for a railway car truck, a wheel and axle assembly comprising a braking surface, an equalizer supported from said assembly, a spring seat member on said equalizer comprising a top web and spaced inboard and outboard webs embracing said equalizer, springs on said top web, a truck frame supported from said springs, a brake support member having an end portion with substantially horizontal top and bottom bearing surfaces of generally rectangular form, resilient means compressed between said top surface and said top web, a clamping member secured to said spring seat member and supporting resilient means compressed against said bottom surface, and friction means on said support member for cooperation with said braking surface, said end portion comprising flanges cooperating with said resilient means for distorting the same in shear during relative longitudinal or inboard movement of said brake support member with respect to said equalizer.

2. In a brake arrangement for a railway car truck comprising spaced equalizers, wheel and axle assemblies supporting said equalizers, a separable spring seat carried by each equalizer, spring means on said seats, and a truck frame supported by said spring means; the combination of a brake beam extending transversely of said truck at one side of each assembly and entirely spaced therefrom, and a two-point support constituting the sole means for supporting said beam from said truck comprising a jawlike structure on each seat receiving a flat horizontally disposed portion of said beam.

3. In a brake arrangement for a railway car truck comprising a truck structure and supporting wheel and axle assemblies, a brake beam structure extending transversely of said truck adjacent each assembly at one side thereof, a two-point support for said beam structure comprising a connection between each end thereof and means on said truck structure, friction means carried by said beam structure for cooperation with a braking surface of the adjacent assembly, said support constituting the sole means for suspending said beam structure from said truck structure for transmitting torque thereto, each of said connections comprising a jaw on one of said structures receiving a portion of the other structure, and resilient means within said jaw clamping said portion.

4. In a composite spring seat element for a railway car truck, a member having a top web affording a spring seat, a pocket in one side of said member beneath the level of said seat, a clamping piece removably mounted within said pocket, and spaced resilient means in said pocket mounted respectively on said web and said piece, said member comprising integral means underlying portions of said piece to afford an auxiliary support therefor.

5. In a brake arrangement for a railway car truck comprising a wheel and axle assembly and a truck structure supported therefrom, the combination of a brake support structure extending transversely of said truck adjacent said assembly, means affording a two-point support for said brake support structure from said truck structure independently of said assembly, said support being the sole suspension for said brake support structure, and brake means comprising brake levers fulcrumed from said brake support structure and carrying friction means for engagement with braking surfaces of said assembly, each point of said support comprising spaced resilient means carried by one of said structures and clamping a portion of the other structure.

6. In a brake arrangement for a railway car truck comprising a wheel and axle assembly and a truck structure supported therefrom, the combination of a brake support structure extending transversely of said truck adjacent said assembly, means affording a two-point support for said brake support structure independently of said assembly, said support being the sole suspension for said brake support structure, and brake means comprising brake levers fulcrumed from said element and carrying friction means for engagement with braking surfaces of said assembly, both of said points being disposed in a plane extending transversely of the truck and approximately bisecting said brake support structure on the longitudinal axis thereof, each point of said support comprising a jaw on one of said structures receiving a portion of the other structure.

7. In a brake arrangement for a railway car truck comprising a wheel and axle assembly and a truck structure supported therefrom, the combination of a rigid brake support element extending transversely of the truck adjacent said assembly and entirely spaced therefrom, a two-point support suspending said element from said truck and comprising jaw means on said structure resiliently clamping said element at each end thereof, said support being independent of said assembly and being the sole suspension means for said element, and brake means comprising a brake lever fulcrumed to said element and carrying friction means for cooperation with a brake surface of said assembly.

8. In a brake arrangement for a railway car truck comprising a wheel and axle assembly and a truck structure supported therefrom, the combination of a brake support element extending transversely of said truck adjacent said assembly and entirely spaced therefrom, support means on said structure comprising spaced resilient means clamping each end of said element therebetween at a point lying in a vertical plane extending transversely of the truck and approximately bisecting said element, said support means being independent of said assembly and constituting the sole suspension means for said element, and brake means comprising a brake lever fulcrumed to said element and carrying a brake shoe.

CARL E. TACK.
WESLEY A. HELSTEN.

REFERENCES CITED

The following references are of record in the file of this patent:

UNITED STATES PATENTS

| Number | Name | Date |
|---|---|---|
| 2,253,268 | Eksergian et al. | Aug. 19, 1941 |
| 2,236,898 | Eksergian | Apr. 1, 1941 |
| 2,276,337 | Pflager | Mar. 17, 1942 |
| 2,334,024 | Nystrom et al. | Nov. 9, 1943 |
| 2,365,460 | Eksergian | Dec. 19, 1944 |
| 2,399,071 | Tack et al. | Apr. 23, 1946 |